(No Model.) 3 Sheets—Sheet 1.

C. CHALLINER.
TIRE FOR VEHICLE WHEELS.

No. 449,281. Patented Mar. 31, 1891.

Witnesses
C. S. Champion.
C. L. Richards.

INVENTOR
Charles Challiner
By his Atty Richards (No Model.) 3 Sheets—Sheet 2.
C. CHALLINER.
TIRE FOR VEHICLE WHEELS.
No. 449,281. Patented Mar. 31, 1891.
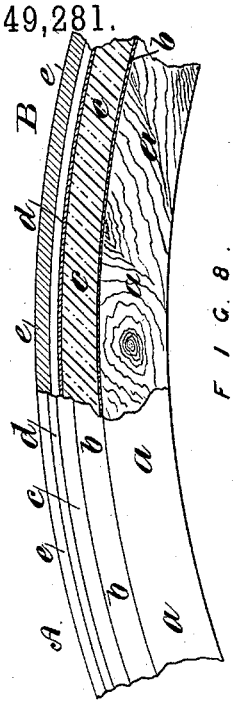
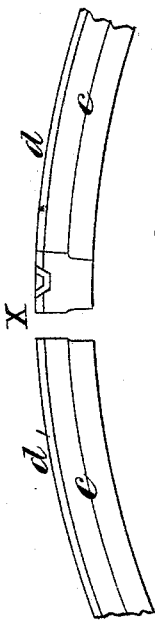
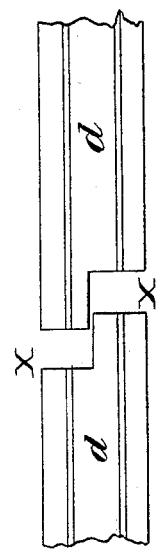
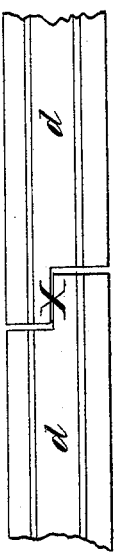
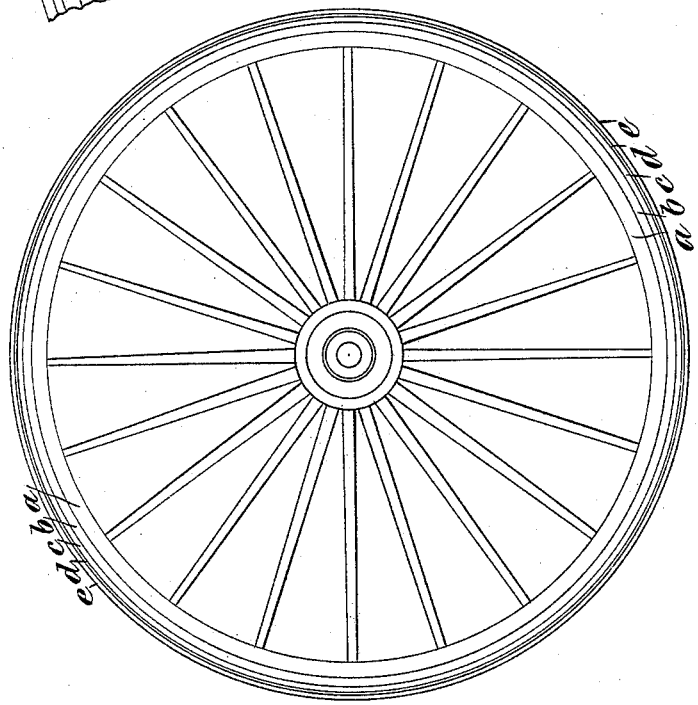
Witnesses:
C. D. Smith
Chas. Rhodes.
Inventor:—
Charles Challiner,
by Richards & Co.
attys.

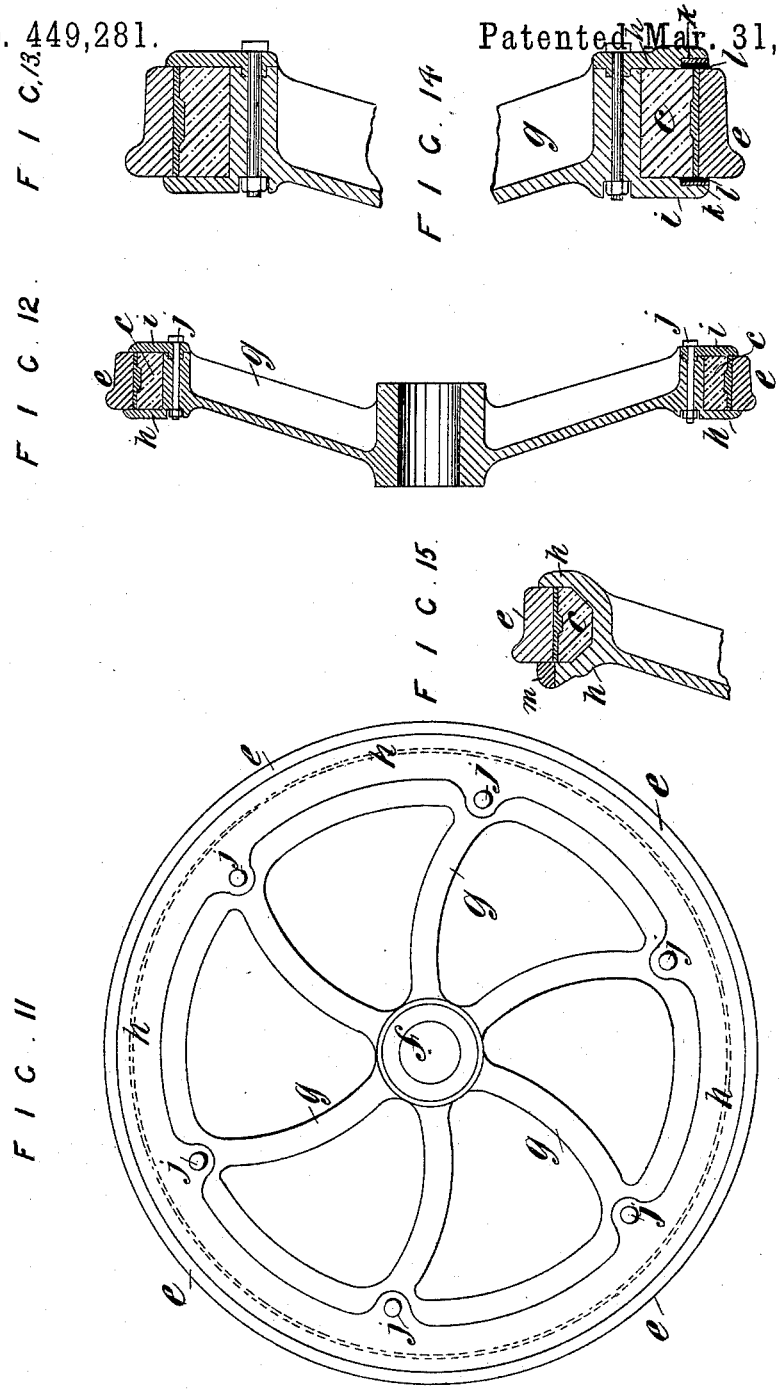

UNITED STATES PATENT OFFICE.

CHARLES CHALLINER, OF LONGSIGHT, ENGLAND.

TIRE FOR VEHICLE-WHEELS.

SPECIFICATION forming part of Letters Patent No. 449,281, dated March 31, 1891.

Application filed September 30, 1890. Serial No. 366,703. (No model.) Patented in England July 26, 1888, No. 10,819.

*To all whom it may concern:*

Be it known that I, CHARLES CHALLINER, a subject of the Queen of Great Britain and Ireland, residing at 15 Plymouth Avenue, Longsight, Manchester, Lancaster county, England, have invented certain new and useful Improvements in and Relating to the Tires of Carriages and other Vehicles, (for which I have obtained Letters Patent of Great Britain, No. 10,819, dated July 26, 1888;) and I hereby declare the following to be a full, clear, and exact description of the same.

My said invention relates to the tires of wheeled vehicles, and particularly to those in which rings of india-rubber or other suitable material are employed.

My invention has for its object to lessen the noise and vibration caused by the passing of the vehicle over the roadway, or over plates or rails where the vehicle is destined to run on such, and is at the same time intended to prevent the destruction of the india-rubber ring or tire. With this object I surround the india-rubber ring or tire with a metal facing, which protects it from wear, and to permit of the shrinking on of the said outer metal facing or tire I first surround the rubber ring with a metal hoop, to which the rubber is preferably vulcanized, although the said hoop and the rubber might also be united by cement or other means. The rubber ring thus united to the metal hoop is formed with an open half-checked or butt or other joint, or is split or formed in halves or in segments, so that it can be easily applied to the wheel, and when in position on the felly the whole is surrounded and held firmly in position by the outer shrunk-on tire. The inner surfaces of the hoop and tire are formed so as to prevent displacement.

To render my invention more clear, I will now proceed to describe the same more particularly with reference to the annexed three sheets of drawings.

On Sheet 1 of the said drawings, Figures 1, 2, 3, 4, and 5 illustrate in cross-section the most obvious forms of my invention.

Sheet 2 contains a view of a complete wheel and detail views explanatory of the method of forming and applying the ring, hoop, and tire.

Sheet 3 illustrates a tramway-wheel made in accordance with my invention.

Figure 1:
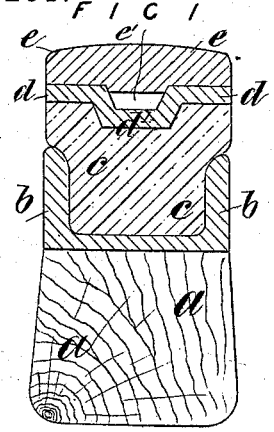

Referring in the first place to Sheet 1 of the drawings, Fig. 1 is a section of a wheel-rim with my improvement applied, and intended for use in such a vehicle, for example, as a hansom or other cab. The felly $a$ is surrounded by a trough-shaped ring $b$, which is shrunk onto the felly or otherwise properly secured thereto. Within the trough-shaped ring $b$ I place a rubber ring $c$, having a metal face or hoop $d$, the rubber being vulcanized to the hoop. The rubber $c$ is recessed, as shown, and a projection $d'$ on the inner circumference of the hoop fills the recess of the rubber. By this means the hoop $d$ is more firmly secured to the rubber, and sidelong displacement or separation of the hoop and the rubber is prevented. When the hooped rubber has been applied to the rim in a manner which will be described with reference to Sheet 2, the outer tire $e$ is placed round the whole and shrunk on in position, compressing the metal-faced rubber ring $c$ firmly in the trough-ring $b$. The recess which appears in the back of the hoop $d$ or metal face of the rubber ring is occupied by a rib or projection $e'$, formed on the inner circumference of the tire $e$, so that the tire $e$ cannot move to one side or the other.

Figure 2:
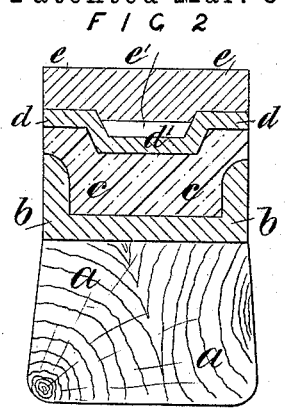

Fig. 2 shows a section similar to Fig. 1, but adapted for a heavier class of vehicle—such, for example, as a cart or heavy carriage. It will be observed that a less thickness of rubber is used.

Figure 3:
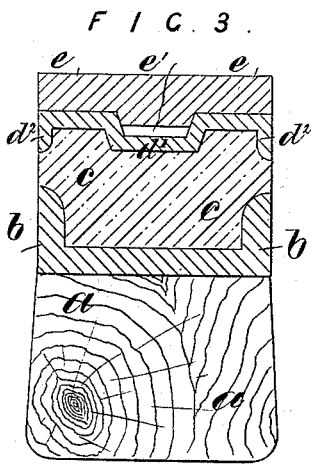

In Fig. 3, which is designed for use in still heavier vehicles—such as lorries and the like—the hoop $d$ is formed with side flanges or lips $d^2$, which embrace this rubber ring $c$ on each side in the same manner as the trough-shaped ring $b$. By this means greater stiffness is given to the elastic tire or rim, so as to qualify it to resist the heavy strains brought upon it. The construction is otherwise the same as in the foregoing figures.

Figure 4:
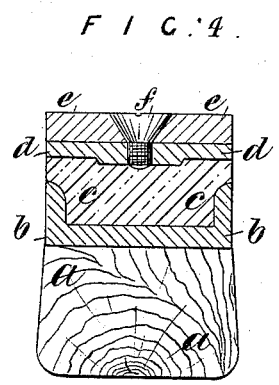

In Fig. 4 the hoop $d$ has no recess in its outer circumference, and the inner circumference of the outer tire $e$ is also flat. To give the requisite or desirable attachment between the outer tire $e$ and the hoop $d$, I secure them together by means of screws or studs $f$, the heads of which occupy countersunk holes in the outer tire $e$, so as to be flush with the outer surface, while the screwed shanks enter tapped holes in the thickest part of the hoop $d$.

Figure 5:
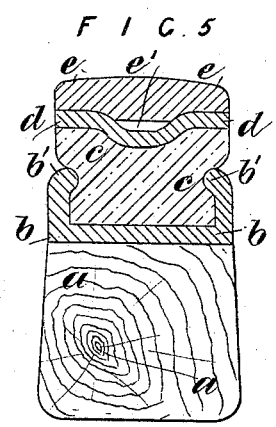

Fig. 5 shows the rubber ring $c$ forced into a trough-shaped ring $b$, having overhanging sides or retaining-ridges $b'$, which hold the rubber $c$ in the ring $b$ independently of the retaining effect of the hoop and tire. The ring $b$ may either be formed as shown in Fig. 5, or it may have dovetail or inclined sides, although I do not make any claim for such dovetail or inclined sides in the ring $b$ independently of or apart from my present invention. The depression in the hoop $d$ may also be rolled in the curved form shown at Fig. 5.

In all cases I prefer to further secure the hooped rubber ring $c$ in the ring $b$ by means of cement.

In Sheet 2 of the drawings, Fig. 6 shows a complete wheel fitted with my improved tire.

Fig. 7 shows a portion of the felly and tire to a larger scale, the part marked A being an outside view and the part marked B being in section. I have already observed that for convenience in applying the rubber the ring is or may be cut so as to form a butt or checked joint.

In Fig. 8 I show a portion of the rubber ring $c$ with the hoop $d$ vulcanized thereto, the joint at $x$ appearing open. This joint might either be a flat butt-joint or I might half-check the ends to be joined, as shown at Fig. 9, which represents the rubber ring and hoop before being closed up by the binding action of the outer encircling tire $e$.

Fig. 10 shows the joint after having been closed by the pressure of the said outer tire. When fitting wheels with my improved tire, I first vulcanize the hoop $d$ to the outer circumference of the split rubber ring $c$, the hoop being split at the same point as the rubber. Then having coated the interior of the trough-ring $b$ with cement when $in\ situ$ on the wheel-felly I insert the rubber ring, on the completion of which operation the joint of the hooped ring is open, as in Fig. 9. I now heat the outer tire $e$ till it has expanded sufficiently to embrace the hooped rubber ring, after which it is cooled and shrunk on in position, binding the whole of the parts together and closing the open joint of the hooped ring, as shown in Fig. 10. The faces of the joint might also be coated with cement to secure cohesion and prevent opening. Instead of having the joint of the hooped ring half-checked, as shown in the drawings, I might make it a plain butt-joint, as aforesaid, or a V-joint, or of any other suitable shape.

In Sheet 3 of the drawings, Fig. 11 shows a tramway-wheel in side elevation, and Fig. 12 the same in cross-section, Fig. 13 showing the rim in section to a larger scale. The boss $f$, arms $g$, and ring $h$ are formed in one piece, while the ring $i$ is bolted on by means of the bolts $j$, thus forming a trough-shaped recess round the circumference, into which the hooped rubber ring $c$ is inserted, as aforesaid. The flanged tire $e$ is thereafter shrunk on, as already described with reference to the other drawings, and the wheel is completed.

In order to soften sidelong thrusts and shocks—such, for example, as take place when rounding a corner or when the car is switched from one track to another—I introduce elastic material between the flanged tire $e$ and the sides of the recess into which it is shrunk, so as to prevent the unyielding contact between metal and metal. This modification is shown to an enlarged scale at Fig. 14 on Sheet 1. In this case I introduce rings $k$ of rubber, leather, or other suitable yielding material between the sides of the tire $e$ and the faces of the rings $h\ i$, so that when the tire $e$ is forced against one side or the other of the recess these rubber rings $k$ act as buffers and soften the shock. Thin rings of metal $l$ are introduced between the said side rings and the rubber and tire, as shown; but these might be dispensed with.

The invention might be applied to the construction of railway-wheels.

Fig. 15 is a sectional view of the rim of a tramway-wheel showing a mode of construction different from the methods hereinbefore set forth. I cast the rim or ring $h$ with a recess to take the hooped rubber ring $c$. When the said hooped rubber ring has been inserted, I shrink on the flanged tire $e$, and finally shrink the retaining-ring $m$ upon the side of the rim $h$, thus boxing in the rubber and making all secure without the aid of bolts or screws. Side rings of rubber might be applied to this form of wheel, as shown at Fig. 14.

The details of manufacture, shape, and construction of the wheel may be varied so long as the principle of my invention is adhered to, which consists in the use of a rubber tire applied to the felly of the wheel, in combination with an outer metal coating or ring or tire to protect the rubber from too rapid wear.

I claim as my invention—

1. In a vehicle-wheel, the combination of a grooved or trough-shaped rim, a compound tire consisting of a rubber ring $c$ and an inclosing metallic hoop $d$, and an outer metallic tire shrunk in place over the said hoop, substantially as set forth.

2. In a vehicle-wheel, the combination of a grooved or trough-shaped rim, a compound tire consisting of a divided rubber ring $c$, and an inclosing divided metallic hoop $d$, vulcanized thereto, and an outer metallic tire shrunk in place over the said hoop, substantially as set forth.

3. In a vehicle-wheel, the combination of a grooved or trough-shaped rim, a compound tire consisting of a rubber ring $c$ and a metallic hoop $d$, having a recess $d'$, and an outer metallic tire having a projection $e'$, and shrunk in place over said hoop, substantially as set forth.

4. The combination of a rim having a peripheral groove or recess, a rubber ring $c$ therein, an outer metallic tire encircling said ring, and elastic cushions $k$, interposed between the sides of said metallic tire and the flanges or sides of the recessed rim, substantially as set forth.

5. The combination, with a rim having a peripheral groove or recess, one side or flange of which is shrunk upon the main portion of the rim, of a rubber ring $c$, an inclosing metallic divided hoop $d$, and an outer tire shrunk upon said hoop, substantially as set forth.

In witness whereof I have hereunto set my hand in presence of two witnesses.

CHARLES CHALLINER.

Witnesses:
DAVID FULTON,
RICHARD IBBERSON.